Nov. 22, 1966   N. C. SCHUTT ETAL   3,286,568
RECIPROCABLE CUTTING MECHANISM WITH STRIPPER
Filed March 25, 1964
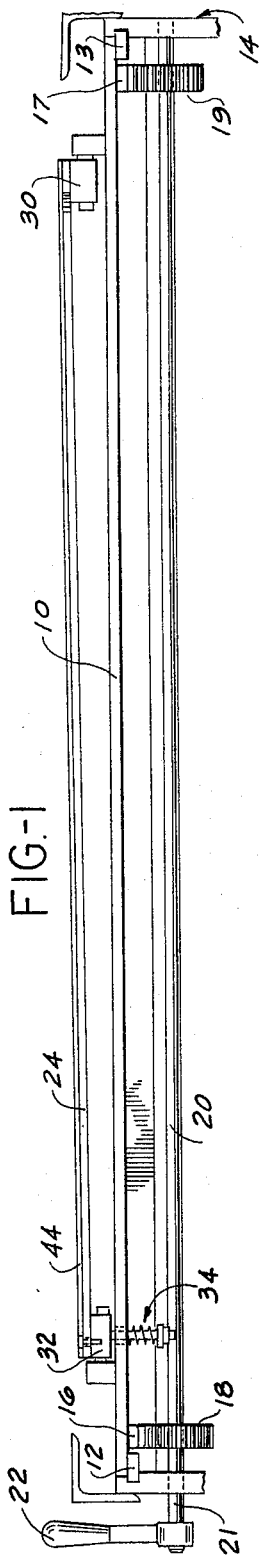
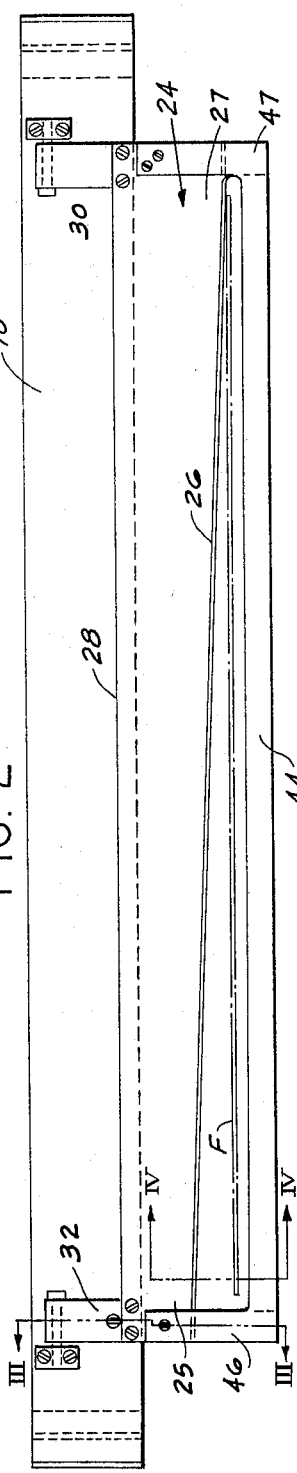
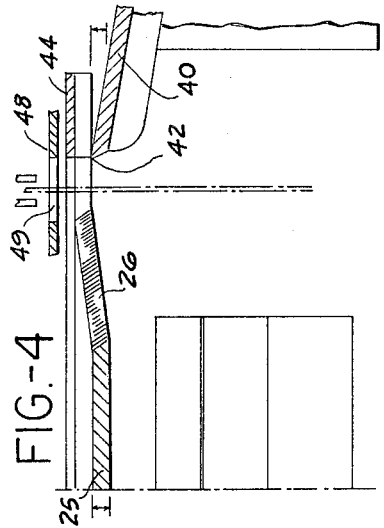
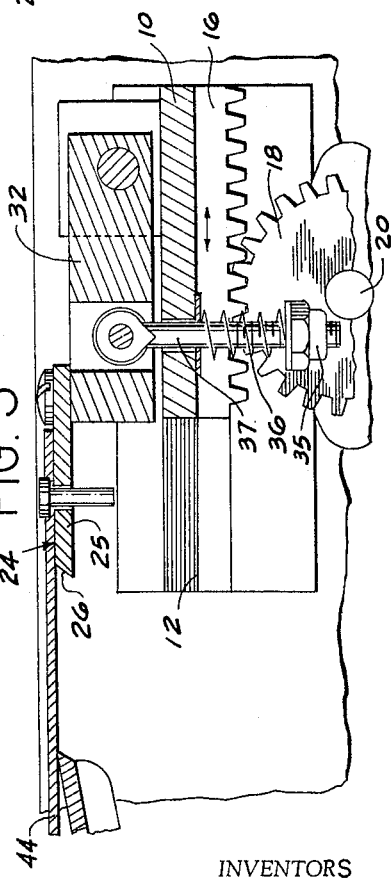
INVENTORS
NORMAN C. SCHUTT
FLOYD W. FLYNN
JOHN L. BJELLAND
BY
MORGAN, FINNEGAN, DURHAM & PINE
ATTORNEYS

United States Patent Office 3,286,568
Patented Nov. 22, 1966

3,286,568
RECIPROCABLE CUTTING MECHANISM
WITH STRIPPER
Norman C. Schutt and Floyd W. Flynn, Glen Cove, and
John L. Bjelland, Glen Head, N.Y., assignors to Powers
Chemco, Inc., Glen Cove, N.Y., a corporation of New
York
Filed Mar. 25, 1964, Ser. No. 354,612
2 Claims. (Cl. 83—136)

The present invention relates generally to photomechanical cameras of utility especially in the graphic arts or process-photography field, and relates more particularly to a novel and improved cutting means especially suitable for use in such cameras.

Although the cutting mechanism of this invention is particularly adapted for use in photomechanical cameras, it is to be understood that the principles underlying the operation of the invention are not limited to such usage. However, since the invention is particularly useful in such cameras, reference will be made hereinafter thereto in order to provide an example of a practical and useful embodiment of the invention.

In prior photomechanical cameras, such, for example, as that shown and described in U.S. Patent No. 1,832,656, issued to F. T. Powers on November 17, 1931, and in present improvements therein, such as our co-pending application Ser. No. 340,034, filed January 24, 1964, the cutting device used to sever the exposed end of the film from the film supply roll comprised a knife blade which was drawn along the face of the film from edge to edge. The disadvantage of that type of cutter is that it requires a long pulling motion, the knife blade becomes dull in a short time, and the knife blade tends to pull the film to one side as to become off-center from the film supply roll, especially when the blade has become dulled. In a magazine camera having a plurality of film supply rolls mounted therein so as to be selectively positioned at a common station for feeding onto a film support, such as is disclosed in my copending application, it is important that the film rolls be severed quickly and cleanly with reliability, to prevent clogging the film feed station.

It is therefore an object of this invention to provide a novel and improved cutting means for severing the exposed end of film from the film supply roll in a photomechanical camera.

A further object of this invention is to provide in a novel cutting means, a knife blade having one end thereof wider than the other end to angle the cutting edge across the length thereof, so that the cut progresses along the length of the knife blade when brought into contact with a shear blade.

A still further object of the present invention is to provide in a novel cutting means having a knife blade with its cutting edge angled across the length thereof, tension means for maintaining the knife blade in tension against the shear blade as the cut progresses across the length thereof.

Another object of the invention is to provide in a novel cutting means having a knife blade in tensioned cutting engagement with a shear blade, means for guiding the knife blade in a substantially constant plane during the cutting operation and for returning the leading edge of the cut material to the area between the cutting blades after each cutting operation.

Additional objects and advantages of the invention will be set forth in the description which follows, and in part will be obvious from the description, or may be learned by practice of the invention, the objects and advantages being realized and attained by means of the instrumentalities and combinations particularly pointed out in the appended claims.

Briefly described, the present invention includes a knife blade mounted onto a movable carrier which moves the knife into and out of cutting engagement with a shear blade. The knife blade is provided with one end wider than the other so that the cutting edge is angled across the length thereof. Further, tension means are provided which serve to keep the knife blade in tension against the shear blade as the cut progresses across the length of the blades. Additionally, a stripper bar is mounted on said knife blade so as to extend forwardly of the cutting edge thereof and in contact with the cutting edge of the shear blade to thereby maintain a substantially constant shear relationship between the cutting edges of the blades. The stripper bar also serves to return the leading edge of the cut material to the area between the cutting blades after each cutting operation.

It will be understood that the foregoing general description and the following detailed description as well are exemplary and explanatory of the invention but are not restrictive thereof.

The accompanying drawings, referred to herein and constituting a part thereof, illustrate one embodiment of the invention and, together with the description, serve to explain the principles of the invention.

Of the drawings:

FIGURE 1 is a front elevation of the cutting mechanism of the present invention, illustrating the carrier moving means and the tension mounting means for the knife member;

FIGURE 2 is a top plan view of the cutting mechanism of the present invention, illustrating the angled edge of the knife member;

FIGURE 3 is a fragmentary sectional view taken along the line 3—3 of FIGURE 2; and FIGURE 4 is fragmentary end elevational view, partly diagrammatic and partly in section, taken along the line 4—4 of FIGURE 2.

Referring now to the drawings for a detailed description of a preferred and illustrative embodiment of the invention, there is shown an elongated, rectangularly shaped carrier member 10, each end thereof being slidably mounted on shoulders 12 and 13 positioned near the uppermost end of a frame designated generally by the reference numeral 14. Secured to the bottom side of carrier 10 at each end thereof adjacent to the shoulders 12 and 13 are racks 16 and 17. In meshing engagement with said racks 16 and 17 are pinion gears 18 and 19, respectively, connected by pinion shaft 20 of which end 21 passes through the frame 14 and is provided at its terminus with a handle 22 for rotating the pinion shaft.

Mounted in tension on the top side of carrier 10 intermediate racks 16 and 17 is a knife blade 24 in substantially parallel relationship to the carrier member, to be more fully described hereinbelow. The cutting edge 26 of the knife is angled across the length of the blade with respect to the back edge 28 such that blade 24 is shaped as a rectangular trapezoid, the widest end termed herein the leading end 27 and the narrowest end termed herein the trailing end 25. Knife blade 24 is rigidly secured at both its leading end 27 and trailing end 25 to mounting blocks 30 and 32, respectively. Mounting block 30 is affixed in a stationary manner to the carrier while mounting block 32 is resiliently affixed to the carrier by means of an adjustable, spring-biased nut-and-bolt assembly indicated generally by the reference numeral 34. Thus, by drawing down nut 35 against spring 36 encircling bolt 37, spring 36 being intermediate nut 35 and the bottom side of carrier 10, mounting block 32 is pulled closer to the carrier, tending to wrap knife blade 24 thereby placing it in tension across its length, the amount of tension determined by the distance that the nut 35 is drawn down on bolt 37, for reasons described in detail hereinbelow.

A stationary shear blade 40 is also provided on frame 10 having its cutting edge 42 slightly angled in a vertical direction, cutting edge 42 also being parallel to the back edge 28 of knife blade 24, and mounted in substantially the same plane as the cutting edge 26 of knife blade 24, in spaced relationship thereto.

The operation of the foregoing described cutting mechanism is as follows: rotation of handle 22 in a clockwise direction rotates pinions 18 and 19 which are in meshing engagement with racks 16 and 17, thereby sliding carrier 10 along shoulders 12 and 13 of frame 14 toward stationary shear blade 40. As carrier 10 moves toward the shear blade, the leading end 27 of the cutting edge 26 of knife blade 24 comes into contact with the film F or other material to be cut and the cutting edge 42 of shear blade 40. As the movement of the carrier continues, the point of cutting contact between the two blades progresses along the angled edge of the knife blade until the entire length thereof has passed over the shear blade. It will be seen that by having placed the proper amount of warpage in the knife blade aforehand by means of the spring-biased nut-and-bolt assembly 34, the two blades will continue to remain in tensioned contact as the cut progresses. The knife blade is withdrawn from cutting engagement with the shear blade simply by rotating handle 22 in a counter-clockwise direction.

The present invention also includes the provision of means for guiding the movable knife 24 in a substantially constant plane so as to maintain the proper cutting relationship between the movable cutting edge 26 and the shear blade 40, continuously from an "open" position to the closed, shearing position, and further includes means for returning the leading edge of the film, or other material being cut, to the area between the cutting blades after each cutting operation.

To this end, a stripper bar 44 is mounted directly on to knife blade 24 by means of arm members 46 and 47 so as to form bar 44 as an integral forward extension of the cutting edge 26 of knife blade 24. As best illustrated in FIGURES 3 and 4, the bottom plane of arm members 46, 47 is an extension of the plane of cutting edge 26, and is preferably always in contact with the cutting plane of shear blade 40. Thus, the forwardly extending arm members serve to continuously maintain the proper shear relationship between the cutting edge 26 of knife blade 24 and the cutting shear blade 40.

When it is desired to cut a selected length of film from a film supply roll in a photomechanical camera, such as that described in our aforementioned co-pending application, Ser. No. 340,034, the film is dispensed downwardly from the film magazine housing 48 to the knife mechanism, and the movable knife blade shears on the upper or magazine side of the shear blade. This causes the leading edge of the film from the magazine to be displaced over the top plane of the shear blade. Stripper bar 44 returns the film to the clear area between the two blades, for subsequent dispensing, when the movable knife blade returns to its "open" position. Hence the stripper bar prevents the film from hanging up on the shear blade and clogging the housing opening 49.

The invention in its broader aspects is not limited to the specific embodiment herein shown and described but departures may be made therefrom within the scope of the accompanying claims, without departing from the principles of the invention and without sacrificing its chief advantages.

What is claimed is:

1. Cutting means for cutting a selected length of material from a material supply roll comprising a movable carrier member, a knife blade having one end of its cutting edge wider than the other, mounting means for mounting said knife blade at each end to said carrier, at least one of said mounting means including spring means for providing tension in said knife blade, a shear blade, extension means mounted integrally with said knife blade and in contact with the cutting plane of said shear blade, said extension means comprising a pair of arm members mounted at each end of said knife blade and extending forwardly of the cutting edge thereof, whereby as said knife blade is brought into cutting engagement with said shear blade, the cut progresses from the widest end of said knife blade to its narrowest end, said spring means maintains continuous tension on said knife blade during the cutting operation, and said extension means maintains the cutting edge of said knife blade in the desired shear relationship with said shear blade, and stripper means mounted to said extension means, said stripper means extending substantially longitudinally of said knife blade, whereby the leading edge of the cut material is positioned between said shear blade and said knife blade after each cutting operation.

2. Cutting means as claimed in claim 1 wherein said stripper means comprises a bar extending between, and normally to, said arm members.

References Cited by the Examiner

UNITED STATES PATENTS

| | | | |
|---|---|---|---|
| 635,457 | 10/1899 | Yandall | 83—582 |
| 693,099 | 2/1902 | Bayler | 83—694 X |
| 1,160,564 | 10/1915 | Beidler | 83—629 X |
| 2,186,884 | 1/1940 | Shomaker | 83—610 |
| 2,640,539 | 6/1953 | Piper | 83—136 |
| 2,748,861 | 6/1956 | Von Stoeser | 83—203 |
| 3,176,563 | 4/1965 | Sharpe | 83—241 |

WILLIAM W. DYER, Jr., *Primary Examiner.*

L. B. TAYLOR, *Assistant Examiner.*